United States Patent Office 3,541,139
Patented Nov. 17, 1970

3,541,139
RESOLUTION OF RACEMIC α-HYDROXY-
β,β-DIMETHYL-γ-BUTYROLACTONE
Robert Winterbottom, New City, N.Y., and William M. Ziegler, Clementon, N.J., assignors to American Cyanamid Company, Stamford, Conn., a corporation of Maine
No Drawing. Filed Oct. 19, 1967, Ser. No. 676,633
Int. Cl. C07c 87/66
U.S. Cl. 260—501.1      1 Claim

ABSTRACT OF THE DISCLOSURE

This disclosure describes a process for the resolution of racemic α-hydroxy-β,β-dimethyl-γ-butyrolactone by converting the racemic lactone into the (+) or (−) 1-(1-naphthyl)ethyl amine salts of the (+) and (−) α,γ-dihydroxy-β,β-dimethylbutyric acids, separating the salts by fractional crystallization, and then converting the separated salts into the optical isomers (−) and (+) α-hydroxy-β,β-dimethyl-γ-butyrolactone.

BRIEF SUMMARY OF THE INVENTION

This invention relates to the resolution of racemic α-hydroxy-β,β-dimethyl-γ-butyrolactone, and to new compounds obtained in such resolution. More particularly, the present invention relates to the resolution of racemic α-hydroxy-β,β-dimethyl-γ-butyrolactone into its optical isomers by forming the (+) or (−) 1-(1-naphthyl)ethyl amine salts of the (+) and (−) a,γ-dihydroxy-β,β-dimethylbutyric acids, following which the salts are separated by fractional crystallization, and then are converted into the optical isomers (−) and (+) α-hydroxy-β,β-dimethyl-γ-butyrolactone.

DETAILED DESCRIPTION OF THE INVENTION

The symbols "(+)" and "(−)" are used to designate the optical isomers and refer to the direction of rotation of polarized light by the isomers. These symbols are used in preference to the designation "dextro" (or "d") and "laevo" (or "l") because the latter are used to denote the absolute optical configuration of the compounds involved. The (+) lactone gives rise to the (−) acid and vice versa. The (−) lactone is a starting material in the synthesis of d-pantothenic acid, a growth promoting substance. The (−) lactone is reacted with β-alanine or its esters to form the d-pantothenic acid.

It has been discovered in accordance with the present invention that (+) 1-(1-naphthyl)ethyl amine or (−) 1-(1-naphthyl)ethyl amine can be used to resolve racemic α - hydroxy - β,β - dimethyl-γ-butyrolactone. Furthermore, (+) 1-(1-naphthyl)ethyl amine or (−) 1-(1-naphthyl)ethyl amine can be reacted directly with the racemic lactone in water with the resultant opening of the ring to produce the corresponding (+) base (+) acid salt and (+) base (−) acid salt or (−) base (+) acid salt and (−) base (−) acid salt, respectively. Thereafter, the salts can be separated from one another and from any unresolved racemic lactone by fractional crystallization from the aqueous solution. It is a distinct advantage of the present invention that the resolution of the racemic lactone can be accomplished in an aqueous medium without the use of organic solvents. It is another advantage of the present invention that only about half as much (+) or (−) 1-(1-naphthyl)ethyl amine as the more commonly used resolving agents, such as quinine and brucine, is required to effect resolution. Furthermore, the (+) and (−) 1-(1-naphthyl)ethyl amines are much less expensive than the more commonly used alkaloids resolving agents such as quinine, quinidine, cinchonine, conchonidine, strychnine and brucine.

In practicing the process of the present invention racemic α-hydroxy-β,β-dimethyl-γ-butyrolactone may be reacted directly in water solution with (+) 1-(1-naphthyl)ethyl amine or (−) 1-(1-naphthyl)ethyl amine to form a mixture of the diastereoisomeric salts. This reaction is preferably carried out at a temperature of from about 50° C. to about 75° C. and employing about 500 ml. of aqueous solution per mole of lactone used. When one molar equivalent of (+) 1-(1-naphthyl)ethyl amine is employed per mole of racemic lactone, a mixture of (+) 1-(1-naphthyl)ethyl amine (+) α,γ-dihydroxy-β,β-dimethylbutyrate salt and (+) 1-(1-naphthyl)ethyl amine (−) α,γ-dihydroxy-β,β-dimethylbutyrate salt is obtained. The latter crystallizes from the aqueous solution upon cooling and is removed by filtration whereas the former may be recovered from the filtrate upon evaporation of the aqueous solvent. When one molar equivalent of (−) 1-(1-naphthyl)ethyl amine is employed per mole of racemic lactone, a mixture of (−) 1-(1-naphthyl)ethyl amine (+) α,γ-dihydroxy-β,β-dimethylbutyrate salt and (−) 1-(1-naphthyl)ethyl amine (−) α,γ-dihydroxy-β,β-dimethylbutyrate salt is obtained. The former crystallizes from the aqueous solution upon cooling and is removed by filtration whereas the latter may be recovered from the filtrate upon evaporation of the aqueous solvent. When one-half molar equivalent of (+) 1-(1-naphthyl)ethyl amine is employed per mole of racemic lactone, the (+) 1-(1-naphthyl)ethyl amine (−) α,γ-dihydroxy-β,β-dimethylbutyrate salt crystallizes from the aqueous solution upon cooling leaving the (−) lactone in the supernate. When one-half molar equivalent of (−) 1-(1-naphthyl)ethyl amine is employed per mole of racemic lactone, the (−) 1-(1-naphthyl)ethyl amine (+) α,γ-dihydroxy-β,β-dimethylbutyrate salt crystallizes from the aqueous solution upon cooling leaving the (+) lactone in the supernate.

In every case, the diastereoisomeric salt which crystallizes from the aqueous reaction solution upon cooling, and is removed by filtration, is added to a water solution of sufficient sodium hydroxide (or potassium hydroxide) to split the diastereoisomeric salt into the free amine base and the sodium (or potassium) salt of the α,γ-dihydroxy-β,β-dimethylbutyric acid. This reaction occurs rapidly at room temperature and the 1-(1-naphthyl)ethyl amine is then removed by extraction with chloroform or any suitable organic solvent immiscible with water since 1-(1-naphthyl)ethyl amine is soluble in substantially all organic solvents. After removal of the 1-(1-naphthyl)ethyl amine, the aqueous raffinate is acidified to a pH of approximately 1.0 with a mineral acid (concentrated hydrochloric acid, 50% sulfuric acid, etc.) and then allowed to stand at room temperature for a period of time sufficient to lactonize the hydroxy acid. After the lactone is reconstituted, it is extracted from the aqueous raffinate with a suitable organic solvent such as chloroform, methylene chloride, diethyl ether, benzene, carbon tetrachloride, and the like. The extracts are then combined, dried, and the organic solvent removed by distillation. The crude lactone thus obtained may then be further purified by successive recrystallizations from methyl isobutyl ketone. It is to be noted that in the above recovery procedure the (+) 1-(1-naphthyl)ethyl amine (−) a,γ-dihydroxy-β,β-dimethylbutyrate salt gives rise to the (+) lactone whereas the (−) 1-(1-naphthyl)ethyl amine (+) α,γ-dihydroxy-β,β-dimethylbutyrate salt gives rise to the (−) lactone.

Instead of the direct reaction of (+) or (−) 1-(1-naphthyl)ethyl amine with the racemic lactone, anionic salts of the amines may be interacted with cationic salts of the racemic α,γ-dihydroxy-β,β-dimethylbutyric acid in aqueous solution. Suitable anionic salts of the (+) or (−) 1-(1-naphthyl)ethyl amine are, for example, the hydrochloride, hydrobromide, nitrate, sulfate, phosphate, etc. which may be readily prepared by treating the amines with one equivalent of the appropriate acid in water solution. Suitable cationic salts of racemic α,γ-dihydroxy-β,β-dimethylbutyric acid are, for example, the sodium salt, potassium salt, magnesium salt, etc. which may be readily prepared by treating racemic α-hydroxy-β,β-dimethyl-γ-butyrolactone with one equivalent of the appropriate cation hydroxide in water solution. It is to be preferred, however, that the inorganic salt obtained by this double decomposition reaction be water soluble and thus not precipitate with the water insoluble diastereoisomeric salt. In all other respects the conditions of time, temperature, concentration, proportions of reactants, etc. are the same as for the direct reaction of the (+) or (−) amine bases with the racemic lactone and similar results are obtained.

The invention will be described in greater detail in conjunction with the following specific examples.

EXAMPLE 1

Preparation of (+) α-hydroxy-β,β-dimethyl-γ-butyrolactone

To 17 grams of (+) 1-(1-naphthyl)ethyl amine in 20 ml. of water was added 8.2 ml. of hydrochloric acid (specific gravity 1.19) to form a solution of the amine hydrochloride. To this was added 65 ml. of a solution of racemic sodium, α,γ-dihydroxy-β,β-dimethylbutyrate, prepared from 26 grams of the racemic α-hydroxy-β,β-dimethyl-γ-butyrolactone, both solutions being warmed to 60° C. On cooling, the solution deposited crystals of (+) 1-(1-naphthyl)amine (−) α,γ-dihydroxy-β,β-dimethylbutyrate salt which were removed at 4° C. and washed with ice-water. These crystals were suspended in 20 ml. of water and 50 ml. of chloroform, shaken with 6 ml. of 50% sodium hydroxide to a final pH of 10.2, and the layers were separated. The amine was recovered from the chloroform layer. The aqueous phase was treated with 50% sulfuric acid to pH 1.0 and allowed to stand at room temperature for 20 hours. The aqueous phase was then extracted five times with one volume of chloroform. The pooled extracts were evaporated to dryness and 12.5 grams of product was recovered. The specific rotation of the product in water was +36°.

EXAMPLE 2

Preparation of (−) α-hydroxy-β,β-dimethyl-γ-butyrolactone

The procedure of Example 1 was repeated using 17 grams of (−) 1-(1-naphthyl)ethyl amine in place of the (+) 1-(1-naphthyl)ethyl amine, resulting in a yield of 12.5 grams of product having a specific rotation in water of −36°.

What is claimed is:
1. The compound (−) 1-(1-naphthyl)ethyl amine (+) α,γ-dihydroxy-β,β-dimethylbutyrate.

References Cited

UNITED STATES PATENTS 3,185,710  5/1965  Dunkel _____ 260—343.6
3,000,947  9/1961  Bottoms _____ 260—501.1

OTHER REFERENCES

Ozegowski et al.: Chemical Abstracts, vol. 55, col. 390–391 (1961).

LEON ZITVER, Primary Examiner

M. W. GLYNN, Assistant Examiner

U.S. Cl. X.R.
260—343.6